US010068344B2

(12) United States Patent
Jovanovich et al.

(10) Patent No.: US 10,068,344 B2
(45) Date of Patent: Sep. 4, 2018

(54) METHOD AND SYSTEM FOR 3D CAPTURE BASED ON STRUCTURE FROM MOTION WITH SIMPLIFIED POSE DETECTION

(71) Applicant: SMART PICTURE TECHNOLOGIES INC., Austin, TX (US)

(72) Inventors: Dejan Jovanovich, Austin, TX (US); Keith Beardmore, Santa Fe, NM (US); Kari Myllykoski, Austin, TX (US); James H. Grotelueschen, Glen Ellyn, IL (US)

(73) Assignee: SMART PICTURE TECHNOLOGIES INC., Austin, TX (US)

(*) Notice: Subject to any disclaimer, the term of this patent is extended or adjusted under 35 U.S.C. 154(b) by 1 day.

(21) Appl. No.: 15/123,662

(22) PCT Filed: Mar. 5, 2015

(86) PCT No.: PCT/US2015/019040
§ 371 (c)(1),
(2) Date: Sep. 5, 2016

(87) PCT Pub. No.: WO2015/134794
PCT Pub. Date: Sep. 11, 2015

(65) Prior Publication Data
US 2017/0337701 A1    Nov. 23, 2017

Related U.S. Application Data

(60) Provisional application No. 61/948,401, filed on Mar. 5, 2014.

(51) Int. Cl.
*G06K 9/00* (2006.01)
*G06T 7/33* (2017.01)
(Continued)

(52) U.S. Cl.
CPC ............ *G06T 7/33* (2017.01); *G06F 17/30* (2013.01); *G06T 7/579* (2017.01); *G06T 7/97* (2017.01);
(Continued)

(58) Field of Classification Search
USPC .................................... 382/106, 154
See application file for complete search history.

(56) References Cited

U.S. PATENT DOCUMENTS

| 3,711,831 A | 1/1973 | Kaneko et al. |
| 4,801,207 A | 1/1989 | Williams |

(Continued)

FOREIGN PATENT DOCUMENTS

| DE | 19536294 A1 | 4/1997 |
| DE | 202012104890 U1 | 3/2013 |

(Continued)

OTHER PUBLICATIONS

Cain et al. Drawing Accurate Ground Plans Using Optical Triangulation Data. 2003 IEEE Conference on Computer Vision and Pattern Recognition (11 pgs) (Jun. 18-20, 2003).

(Continued)

*Primary Examiner* — Alex Liew
(74) *Attorney, Agent, or Firm* — Wilson, Sonsini, Goodrich & Rosati

(57) ABSTRACT

Aspects disclosed herein provide methods, systems, and devices for 3D image capture based on a Structure from Motion (SFM) imaging technique with simplified pose detection. The present disclosure provides a straightforward method to directly track a camera's motion (pose detection) thereby removing a substantial portion of the computing load needed to build a dimensionally accurate 3D model from a sequence of images taken by the camera.

19 Claims, 4 Drawing Sheets

(51) Int. Cl.
  *G06T 7/579* (2017.01)
  *G06T 7/00* (2017.01)
  *G06F 17/30* (2006.01)
  *G06T 17/00* (2006.01)

(52) U.S. Cl.
  CPC .... *G06T 17/00* (2013.01); *G06T 2207/30204* (2013.01); *G06T 2207/30244* (2013.01)

(56) References Cited

U.S. PATENT DOCUMENTS

| | | |
|---|---|---|
| 5,481,622 A | 1/1996 | Gerhardt et al. |
| 5,699,444 A | 12/1997 | Palm |
| 6,125,197 A | 9/2000 | Mack et al. |
| 6,356,298 B1 | 3/2002 | Abe et al. |
| 6,415,051 B1 | 7/2002 | Callari et al. |
| 7,058,213 B2 | 6/2006 | Rubbert et al. |
| 7,239,732 B2 | 7/2007 | Yamada |
| 7,256,899 B1 | 8/2007 | Faul et al. |
| 8,031,909 B2 | 10/2011 | Se et al. |
| 8,294,958 B2 | 10/2012 | Paterson et al. |
| 8,605,987 B2 | 12/2013 | Chao et al. |
| 8,885,916 B1 | 11/2014 | Maurer et al. |
| 8,922,647 B2 | 12/2014 | Crothers et al. |
| 9,131,223 B1 | 9/2015 | Rangarajan et al. |
| 9,157,757 B1 | 10/2015 | Liao et al. |
| 2003/0012410 A1 | 1/2003 | Navab et al. |
| 2003/0068098 A1 | 4/2003 | Rondinelli et al. |
| 2003/0091227 A1 | 5/2003 | Chang et al. |
| 2003/0095338 A1 | 5/2003 | Singh et al. |
| 2003/0128401 A1 | 7/2003 | Conrow et al. |
| 2004/0095385 A1 | 5/2004 | Koo et al. |
| 2004/0239688 A1 | 12/2004 | Krajec |
| 2005/0031167 A1 | 2/2005 | Hu et al. |
| 2005/0123179 A1 | 6/2005 | Chen et al. |
| 2005/0213082 A1 | 9/2005 | DiBernardo et al. |
| 2005/0261849 A1 | 11/2005 | Kochi et al. |
| 2006/0017720 A1 | 1/2006 | Li |
| 2006/0210192 A1 | 9/2006 | Orhun |
| 2007/0065004 A1 | 3/2007 | Kochi et al. |
| 2008/0062164 A1 | 3/2008 | Bassi et al. |
| 2008/0075324 A1 | 3/2008 | Sato et al. |
| 2008/0095468 A1 | 4/2008 | Klemmer et al. |
| 2008/0123937 A1 | 5/2008 | Arias et al. |
| 2008/0159595 A1 | 7/2008 | Park et al. |
| 2008/0201101 A1 | 8/2008 | Hebert et al. |
| 2009/0268214 A1 | 10/2009 | Lucic et al. |
| 2010/0017178 A1* | 1/2010 | Tsuk ............... G01B 11/24 703/6 |
| 2010/0053591 A1 | 3/2010 | Gibson et al. |
| 2010/0104199 A1 | 4/2010 | Zhang et al. |
| 2010/0201809 A1 | 8/2010 | Oyama et al. |
| 2011/0050640 A1 | 3/2011 | Lundback et al. |
| 2011/0123135 A1 | 5/2011 | Hsieh et al. |
| 2012/0007943 A1 | 1/2012 | Tytgat |
| 2012/0020518 A1 | 1/2012 | Taguchi |
| 2012/0062702 A1 | 3/2012 | Jiang et al. |
| 2012/0176380 A1 | 7/2012 | Wang et al. |
| 2012/0218437 A1 | 8/2012 | Hermary et al. |
| 2012/0287240 A1 | 11/2012 | Grossmann et al. |
| 2012/0293667 A1 | 11/2012 | Baba et al. |
| 2013/0076894 A1 | 3/2013 | Osman |
| 2013/0076896 A1 | 3/2013 | Takabayashi et al. |
| 2013/0136341 A1 | 5/2013 | Yamamoto |
| 2013/0162785 A1 | 6/2013 | Michot et al. |
| 2013/0278755 A1 | 10/2013 | Starns et al. |
| 2013/0307932 A1 | 11/2013 | Mestha et al. |
| 2013/0321585 A1 | 12/2013 | Hassebrook et al. |
| 2013/0324830 A1 | 12/2013 | Bernal et al. |
| 2014/0140579 A1* | 5/2014 | Takemoto ............... G01C 3/08 382/106 |
| 2014/0143096 A1 | 5/2014 | Stubert et al. |
| 2014/0210950 A1 | 7/2014 | Atanassov et al. |
| 2014/0211018 A1 | 7/2014 | De et al. |
| 2014/0307100 A1 | 10/2014 | Myllykoski et al. |
| 2014/0314276 A1 | 10/2014 | Wexler et al. |
| 2015/0260509 A1 | 9/2015 | Kofman et al. |
| 2015/0292873 A1 | 10/2015 | Chou et al. |
| 2015/0316368 A1 | 11/2015 | Moench et al. |
| 2015/0330775 A1 | 11/2015 | Basevi et al. |
| 2015/0331576 A1 | 11/2015 | Piya et al. |
| 2015/0369593 A1 | 12/2015 | Myllykoski |
| 2016/0044301 A1 | 2/2016 | Jovanovich et al. |
| 2016/0134860 A1 | 5/2016 | Jovanovic et al. |
| 2016/0227193 A1 | 8/2016 | Osterwood et al. |
| 2016/0260250 A1 | 9/2016 | Jovanovic et al. |
| 2016/0371855 A1 | 12/2016 | Jovanovic et al. |
| 2017/0249745 A1 | 8/2017 | Fiala |
| 2018/0021597 A1 | 1/2018 | Berlinger et al. |

FOREIGN PATENT DOCUMENTS

| | | |
|---|---|---|
| EP | 2554940 A1 | 2/2013 |
| FR | 2924560 A1 | 6/2009 |
| WO | WO-2006027339 A2 | 3/2006 |
| WO | WO-2007030026 A1 | 3/2007 |
| WO | WO-2013043787 A1 | 3/2013 |
| WO | WO-2013155379 A2 | 10/2013 |
| WO | WO-2015023483 A1 | 2/2015 |
| WO | WO-2015073590 A2 | 5/2015 |
| WO | WO-2015134794 A2 | 9/2015 |
| WO | WO-2015134795 A2 | 9/2015 |

OTHER PUBLICATIONS

Horn et al. Determining optical Flow: a retrospective. Artificial Intelligence 17:185-203 (1981).
Kawasaki et al. Entire model acquisition system using handheld 3D digitizer. 3D Data Processing, Visualization and Transmission, 2004. 3DPVT 2004. Proceedings. 2nd International Symposium on. (pp. 478-485) (Sep. 6-9, 2004).
Klein et al. Parallel Tracking and Mapping for Small AR Workspaces. Mixed and Augmented Reality. ISMAR 2007. 6th IEEE and ACM International Symposium on.(10 pgs) (Nov. 13-16, 2007).
Newcombe et al. DTAM: Dense Tracking and Mapping in Real Time. Computer Vision (ICCV), 2011 IEEE International Conference on. (8 pgs) (Nov. 6-13, 2011).
Nguyen et al. A Simple Method for Range Finding via Laser Triangulation. Technical Document 2734. published by the United States Naval Command, Control and Ocean Surveillance Center, RDT&E Division and NRAD (12 pgs) (Jan. 1995).
PCT/US2013/036314 International Preliminary Report on Patentability dated Oct. 23, 2014.
PCT/US2013/036314 International Search Report and Written Opinion dated Nov. 15, 2013.
PCT/US2014/049900 International Preliminary Report on Patentability dated Feb. 18, 2016.
PCT/US2014/049900 International Search Report and Written Opinion dated Dec. 10, 2014.
PCT/US2014/065309 International Preliminary Report on Patentability dated May 26, 2016.
PCT/US2014/065309 International Search Report and Written Opinion dated May 20, 2015.
PCT/US2015/019040 International Preliminary Report on Patentability dated Sep. 15, 2016.
PCT/US2015/019040 International Search Report and Written Opinion dated Feb. 17, 2016.
PCT/US2015/019041 International Preliminary Report on Patentability dated Sep. 15, 2016.
PCT/US2015/019041 International Search Report and Written Opinion dated Mar. 31, 2016.
Tanskanen et al. Live Metric 3D Reconstruction on Mobile Phones. Computer Vision (ICCV), 2013 IEEE International Conference on. (pp. 65-72) (Dec. 1-8, 2013).
U.S. Appl. No. 13/861,534 Office Action dated Dec. 24, 2015.
U.S. Appl. No. 13/861,534 Office Action dated Jan. 30, 2015.
U.S. Appl. No. 13/861,685 Office Action dated Dec. 4, 2015.
U.S. Appl. No. 13/861,685 Office Action dated Jul. 27, 2016.

(56) References Cited

OTHER PUBLICATIONS

U.S. Appl. No. 13/861,685 Office Action dated Mar. 13, 2015.
U.S. Appl. No. 14/308,874 Office Action dated Apr. 8, 2016.
U.S. Appl. No. 14/308,874 Office Action dated Aug. 3, 2017.
U.S. Appl. No. 14/452,937 Office Action dated Jan. 12, 2017.
U.S. Appl. No. 14/539,924 Office Action dated Oct. 6, 2016.
U.S. Appl. No. 14/639,912 Office Action dated Jan. 11, 2017.
U.S. Appl. No. 14/745,325 Office Action dated Jul. 27, 2017.
Zucchelli. Optical Flow based Structure from Motion. Doctoral Dissertation (142 pgs) (2002).
U.S. Appl. No. 14/308,874 Office Action dated Apr. 3, 2018.
U.S. Appl. No. 14/745,325 Office Action dated Mar. 7, 2018.

* cited by examiner

METHOD AND SYSTEM FOR 3D CAPTURE BASED ON STRUCTURE FROM MOTION WITH SIMPLIFIED POSE DETECTION

RELATED APPLICATION

This application is a National Phase Entry of International Application No. PCT/U2015/019040 filed Mar. 5 2015, which claims priority to U.S. Provisional Application No. 61/948,401, filed on Mar. 5, 2014, both of which are incorporated herein by reference in there entireties.

TECHNICAL FIELD OF THE INVENTION

The present invention generally relates to optical systems, more specifically to electro-optical systems that are used to determine the camera orientation and position (collectively known as pose) and capture 3D models relative to the photographed scene in order to extract correct dimensions and positions of physical objects from photographic images.

BACKGROUND OF THE INVENTION

The task of capturing the 3D information in a scene consists of first acquiring a set of range measurements from the measurement device(s) to each point in the scene, then converting these device-centric range measurements into a set of point locations on a single common coordinate system often referred to as "world coordinates". Methods to acquire the range measurements may rely heavily on hardware such as 2D time-of-flight laser rangefinder systems which directly measure the ranges to an array of points within the measurement field-of-view. Other systems exist that rely heavily on computing power to determine ranges from a sequence of images as a camera is moved around the object or scene of interest. These later systems are commonly called Structure From Motion systems or SFM. Hardware-intensive solutions have the disadvantages of being bulky and expensive. SFM systems have the disadvantage of requiring extensive computing resources or extended processing times in order to create the 3D representation, thus making them unsuitable for small mobile consumer devices such as smart phones.

Existing Structure from Motion (SFM) systems involve two computation paths, one to track the pose (orientation and position) of the camera as it captures a sequence of 2D images, the other to create a 3D map of the object or environment the camera is moving in or around. These two paths are interdependent in that it is difficult to track the motion (pose) of the camera without some knowledge of the 3D environment through which it is moving, and it is difficult to create a map of the environment from a series of moving camera images without some knowledge of the motion (pose) of the camera.

This invention introduces a method and system for capturing 3D objects and environments that is based on the SFM methodology, but with the addition of a simplified method to track the pose of the camera. This greatly reduces the computational burden and provides a 3D acquisition solution that is compatible with low-computing-power mobile devices. This invention provides a straightforward method to directly track the camera's motion (pose detection) thereby removing a substantial portion of the computing load needed to build the 3D model from a sequence of images.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Figure 1:
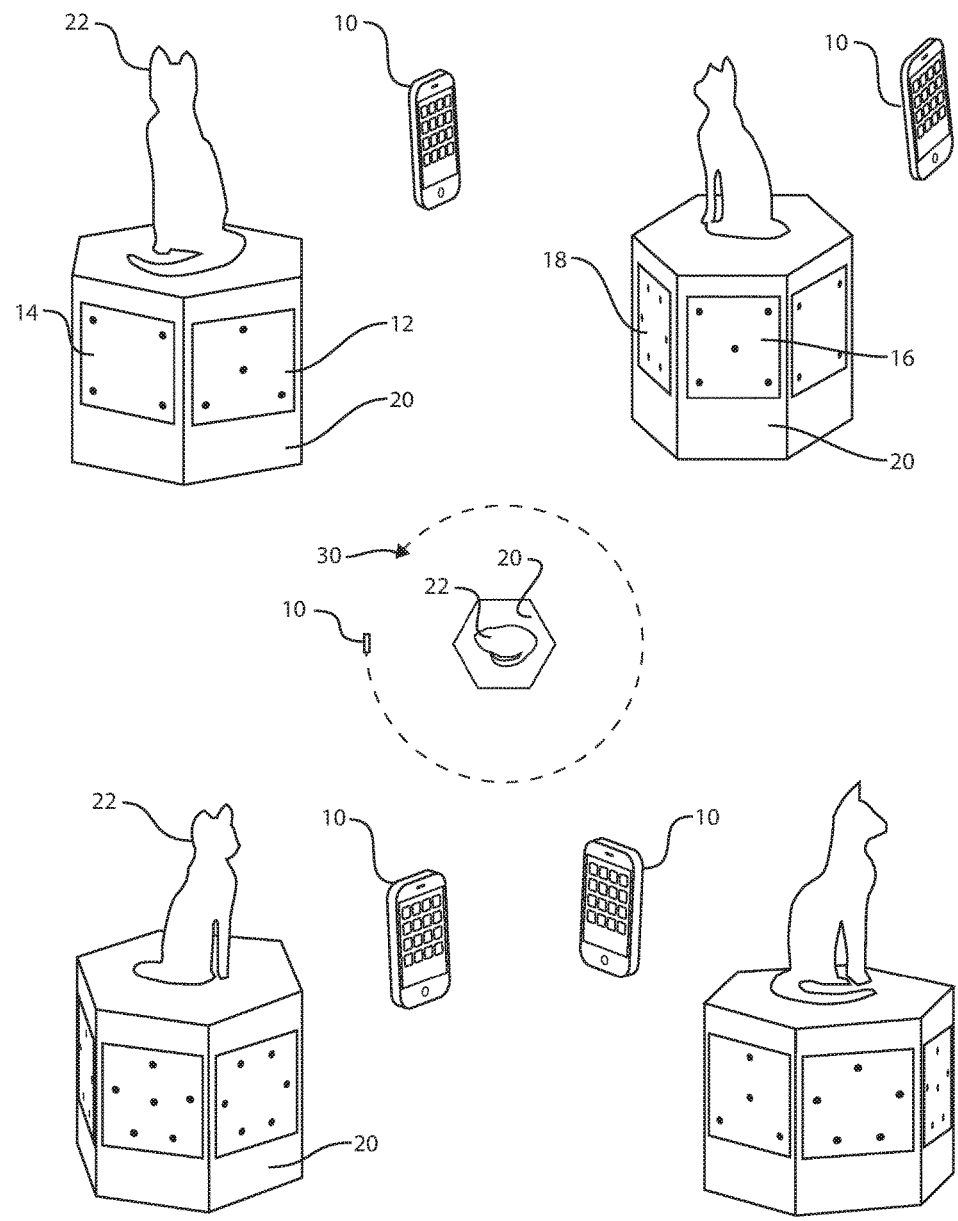
FIG. 1 illustrates an embodiment of the 3D capture system in the process of capturing a sequence of images used to create the 3D model of an object.

Preferred embodiments of the present invention are illustrated in the FIGUREs, like numerals being used to refer to like and corresponding parts of the various drawings.

Before proceeding with the description it would be helpful to define a few terms for the purpose of this written specification. Some of these terms are used loosely from time to time and may mean different things. For example the term "pose" of the camera is sometimes used to refer to the "orientation" of the camera independent of the "position" of the camera. In other cases "pose" is used to include both the orientation and the position of the camera. Sometimes the context makes it clear; sometimes it does not. In this specification the distinction of the two meanings is important so we provide clarifying definitions.

Glossary

3D Mapping or 3D Modeling means a 3D model of an object or scene in world coordinates from which accurate measurements may be derived.

Orientation means the direction in which the central optical axis of the camera is pointed.

Pose means the orientation and position of the camera.

Position means the location of the camera relative to the fixed origin of the world coordinates used in the system.

Proportional 3D Model means a relational data set of the spatial relationship of key features of an object or scene where the scale or absolute size of the model is arbitrary and unspecified.

Range means distance from the point of observation to the point being observed.

SFM means Structure From Motion as further described below.

World Coordinates is a fixed coordinate system for the 3D Mapping which has an absolute position, orientation and scale relative to the scene or object being captured and from which physical measurements of constituent parts of the 3D scene can be extracted.

Structure From Motion (SFM) is a well known technique or category of techniques for determining the 3D mapping of a scene from a sequence of 2D images. Each point of the object or environment being mapped is captured in a minimum of two 2D images. SFM uses the principle of triangulation to determine the range to any point based on how the position of the point shifts in the 2D image from one camera position to another. It is necessary to accurately know the pose (position and angle) of the camera for each of the 2D images in order to be able to correctly calculate the range. Given a sufficient number of 2D views of the scene, existing SFM techniques can determine the pose of the camera in order to create a structural map of the object or scene. However, reliance on the image content alone for determining both the pose of the camera and then a structural model and or structural map is computationally intensive.

Existing SFM methods, whether feature-based or optical-flow-based, must determine corresponding pixels between each video frame in order to track the camera motion. For example, Klein and Murray ("KM") (identified below) start by creating an initial 3D map based roughly on a stereo pair of images and then estimate the camera's pose relative to this map. For each new frame of video, KM first extrapolates from the camera's prior motion to estimate the camera's new pose. Based on that assumed pose, KM calculates where key scene features should have moved to in the new image, followed by detecting these features in the new image and adjusting the pose to match the image. KM runs the tracking and mapping operations in parallel extensively and intensively using a Graphical Processing Unit ("GPU") and a Central Processing Unit ("CPU").

The present 3D Mapping System uses an SFM engine but relieves the SFM engine from having to use this iterative technique for determining the pose of the camera for each image, thereby removing a substantial portion of the computing load needed to build the 3D model from a sequence of images and allowing for the potential for much more accurate results.

The improved mapping system can also be used to produce a non-contact measurement tool and profiler, a robotic vision module, an artificial vision system, and products to help the visually impaired. The products could be integrated as Apps and/or accessories with existing mobile devices such as smart phones, tablets, or notebook computers, or as a stand-alone product. In another embodiment, the digital camera could remain stationary while the scene being recorded is moved to expose views from multiple viewpoints.

Turning now to FIG. 1, the embodiment of the Mapping System is incorporated in a mobile device 10 which includes a digital camera (not shown)—A standard digital video camera or digital still camera which may be integrated into a smart phone, tablet computer or may be a stand-alone accessory or image capture device. The embodiment illustrated in FIG. 1 also illustrates the use of known reference template patterns 12, 14, 16, 18. Note that in FIG. 1 several different known reference templates are employed. In other embodiments reference templates different from those shown may be employed. In other embodiments several copies of the same template may be employed. In the embodiment shown, the reference templates 12, 14, 16, 18 are on a pedestal 20 whose geometry (3D structure) may or may not be known. If the pedestal has a known geometry, in some embodiments this known geometry may be used by the template pattern recognition engine and/or the pose engine and/or the SFM engine and or the mapping engine (each engine further discussed below). However, in the present embodiment the geometry of the pedestal 20 is not necessarily known and is not used.

The object to be mapped in the embodiment illustrated in FIG. 1 is the cat statue 22. FIG. 1 illustrates four different camera pose images in the four outer corners of the illustration and a central top view showing a possible motion pattern 30 of the mapping system 10 in a path 30 around the object 22 to be mapped. Although the image illustrates a circular path of motion 30, it is not necessary that the motion path of the camera be regular. In fact it can be irregular and the irregularity may give better results. This applies to all elements of the change in pose of the camera, both positional change relative to the object and also to the change in orientation of the camera.

Figure 2:
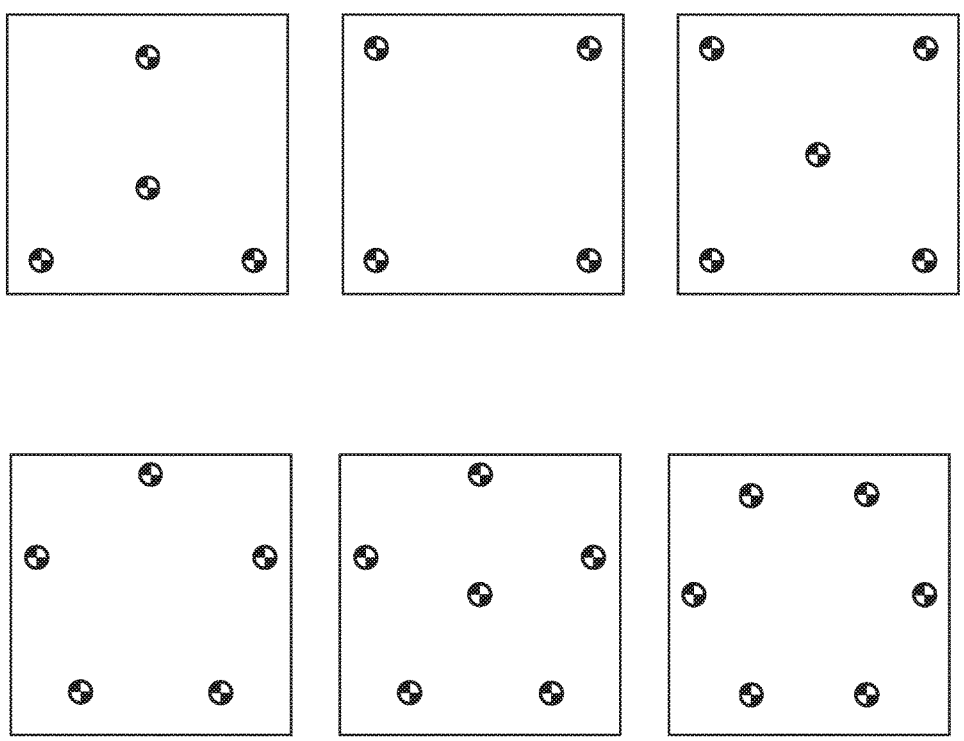
FIG. 2 illustrates examples of reference templates used with the embodiment illustrated in FIG. 1.

FIG. 2 illustrates in greater detail various acceptable reference templates. Many others are possible.

Figure 3:
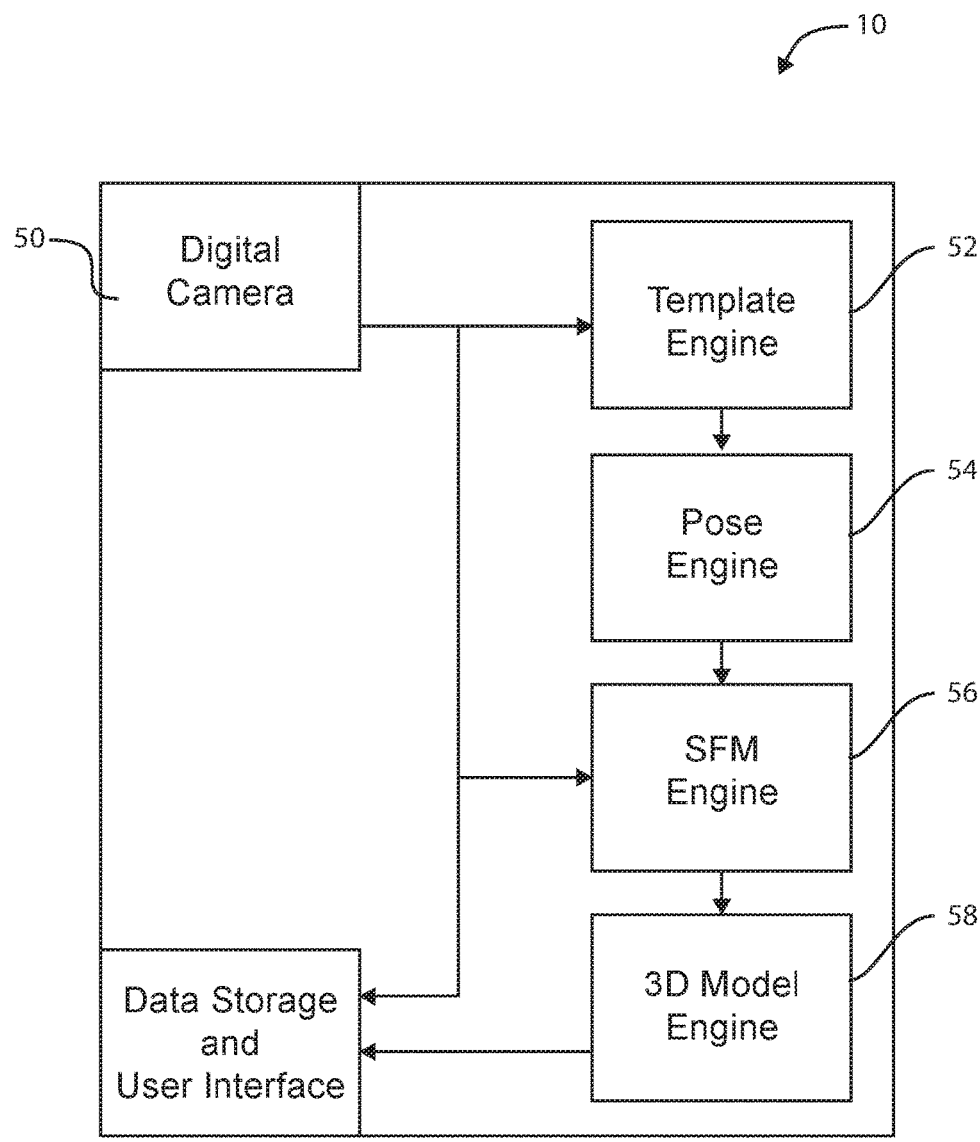
FIG. 3 illustrates a block diagram of major architecture components of an embodiment of the system.

FIG. 3 illustrates a block diagram of major architecture components of an embodiment of the system and the relationship between the components and processing elements used in the embodiment illustrated in FIG. 1. The embodiment 10 includes a digital camera 50 capable of capturing video or some other sequence of images. The embodiment also includes a template engine 52 which recognizes the reference template pattern(s) or known reference objects in the digital image(s) and a pose engine 54 which calculates the orientation and position of the camera for each image using data received from the template engine 52.

The use of a reference template or templates placed into the scene very simply and directly provides the camera pose and scale. The exact geometry of the reference template(s) or reference object(s) is known by the pose detection processor. There is great flexibility on the design of the reference template(s). Rather than, in addition to, or in combination with reference templates a plethora of different reference object(s) may also be used. The reference templates or objects could be 2D pattern(s) or 3D reference objects. The pedestal 20 on which the target object is placed may be a reference object. The reference templates or objects in this specification should not be considered limiting in terms of the design of reference templates or objects. There are an unlimited number of design possibilities. The essential requirement is that the Pose Engine 54 has knowledge of the reference objects or templates. In processing, the system will recognize and identify key features (fiducials) of the reference objects in each image within the sequence of captured images. Therefore, it is advantageous that the reference template/object be chosen for providing speed and ease of recognition. When more than one reference template/object are used, it is not necessary that the templates all be different or that they all be the same pattern. Any combination is acceptable.

The pose engine 54 used in this embodiment compares the known geometry of the reference template with the geometry detected in each image. From this comparison the pose engine 54 determines the camera pose including both the position and orientation of the camera relative to the reference template/object.

The embodiment illustrated in FIG. 3 also includes an SFM engine 56. In this embodiment the SFM engine uses image data captured by the camera together with pose data from the pose engine. Thus the computational complexity of using an SFM engine to calculate camera pose has been avoided. A preferred embodiment for the SFM engine is based on optical flow. The SFM engine 56 operates on pairs of 2D images taken by the camera from different poses. Typically the SFM engine 56 operations are performed on pairs of adjacent images (adjacent in a capture sequence) although non-adjacent images could also be used. For each pair of images, the motion of points in the scene is estimated using an automatic optical flow calculation. Then, using the camera pose determined by the Pose Engine, the range to points in the scene is calculated from the optical flow field. Alternatively, there are a number of other SFM techniques for generating a 3D mapping.

For example See:

Klein, G., & Murray, D. of Oxford, UK: Active Vision Laboratory, University of Oxford, "Parallel Tracking and Mapping for Small AR Workspaces", published in International Symposium on Mixed and Augmented Reality (2007);

Newcombe, R. A., et. al. of London, UK: Department of Computing, Imperial College, "DTAM: Dense Tracking and Mapping in Real Time", published in International Conference on Computer Vision, (2011);

Zucchelli, M., of Stockholm: Royal Institute of Technology, Computational Vision and Active Perception Laboratory, "Optical Flow based Structure from Motion", Doctoral Dissertation (2002) Note: Zucchelli, M describes the use of optical flow in SFM using a more computationally intensive indirect method to estimate the camera's pose compared to the direct camera pose measurement used here; and Petri Tanskanen, et. al., of Zurich, Swiss Federal Institute of Technology (ETH), "Live Metric 3D Reconstruction on Mobile Phones", published in International Conference on Computer Vision, (2013).

Optical Flow is a technique used to track the movement of points or features in a scene from one image of the scene to another. Mathematically, this can be described as follows. Given a point $[u_x, u_y]$ in image $I_1$, find the point $[u_x+\delta_x, u_y+\delta_y]$ in image $I_2$ that minimizes the error $\epsilon$ in a neighborhood around the point, i.e., minimize $$\epsilon(\delta_x, \delta_y) = \sum_{x=u_x-w_x}^{u_x+w_x} \sum_{y=u_y-w_y}^{u_y+w_y} (I_1(x,y) - I_2(x+\delta_x, y+\delta_y)).$$

This technique was originally developed by Horn and Schunck as described in the following reference.

See Berthold K. P. Horn and Brian G. Schunck, "Determining optical Flow: a retrospective", Artificial Intelligence, 17:185-203, 1981.

In the present invention, optical flow is one choice of techniques used to determine the motion of features in the scene from one image to the next in the series of images. The result of this optical flow computation is combined with the camera pose information obtained from the pose engine to calculate the distance to points in the scene based on SFM triangulation.

In the present embodiment discussed, a 3D modeling engine 58 converts the 3D mapping output from the SFM engine 56 in local camera coordinates into a 3D model in world coordinates. The 3D Modeling engine takes the 3D map points generated in local camera coordinates by the SFM engine and assembles the data from the complete sequence of 2D images into a single 3D model of the scene in world coordinates. It uses the ranges from the SFM Engine along with the known camera pose for each local range data set to map the points into the fixed world coordinates. This is done with a coordinate transformation whose transformation matrix values are determined from the pose and that maps the points from local camera coordinates into world coordinates. The 3D Modeling Engine also may include data processing routines for rejecting outliers and filtering the data to find the model that best fits the collection of data points.

Finally the Modeling device contains User Interface and Data Storage functions that provides the user with choices as to how the 3D model and data is to be displayed and stored. The user can request a printer-ready 3D file, dimensional measurements extracted from the model, as well as other operations specific to the application. The 3D model is stored together with application specific data in a Quantified Image/Data File.

Figure 4:
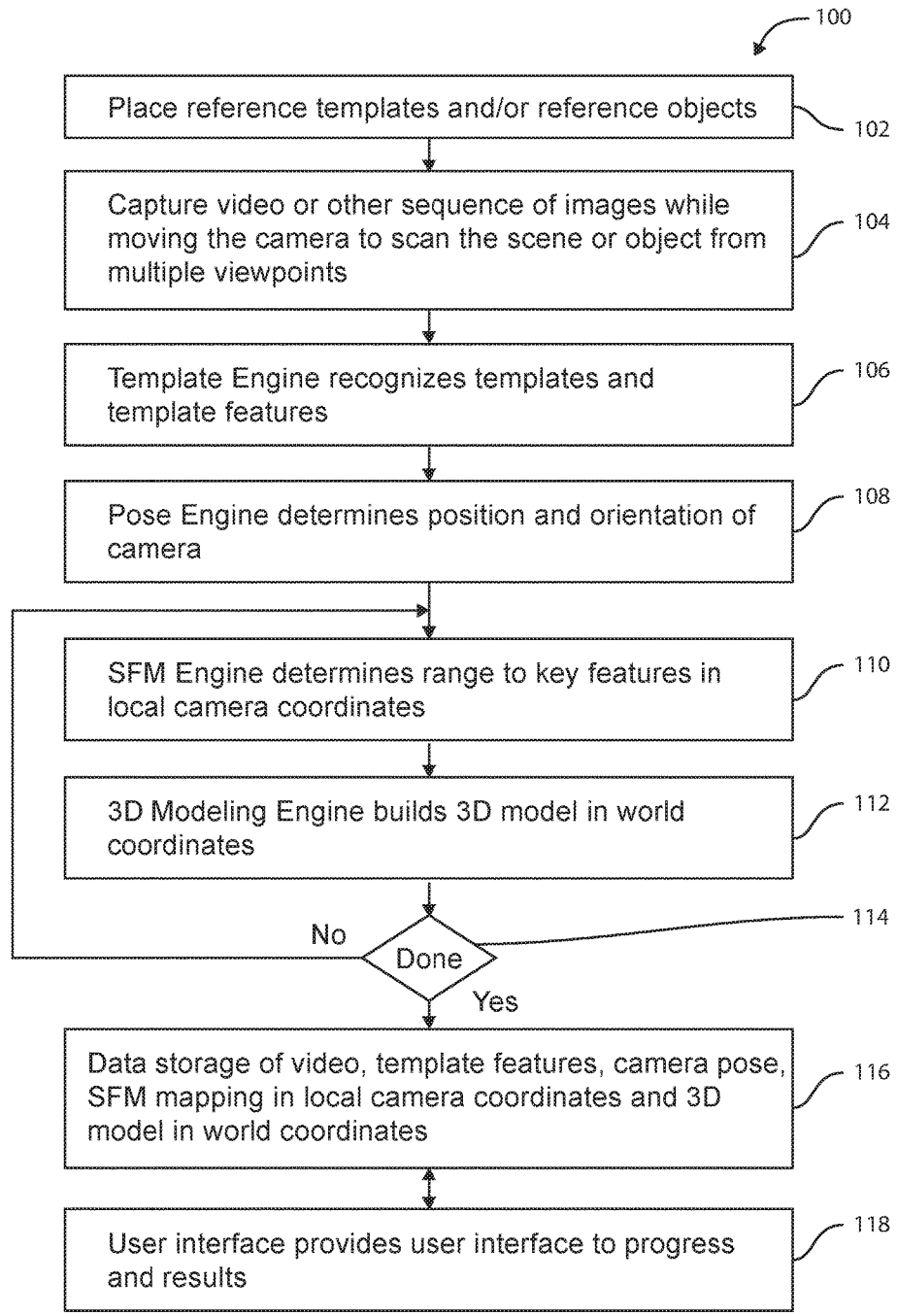
FIG. 4 illustrates the processing flow of the 3D mapping system.

FIG. 4 illustrates the operational flow 100 of using the 3D Capture and Modeling System embodiment illustrated in FIG. 1 and FIG. 3. The first step 102 is placement of reference object(s)/template(s) into the scene or in proximity to the object to be modeled. The next step 104 should be anticipated when the template(s)/object(s) were placed. They should be strategically placed so that at least one reference template/object is in the camera's view through the planned path of the camera in step 104. It is also preferable that each reference template/object be imaged with at least one other reference template/object in at least one 2D image. In some cases, the scene may already naturally contain a known reference object or objects such that it is not necessary to specifically place additional reference objects/templates into the scene. After the reference template(s)/object(s) are placed, the camera is employed to take a video or other sequence of images of the scene or object from a variety of camera poses (position(s) and orientations) 104. In other words, the camera is moved around scanning the scene or object from many viewpoints. The objective of the movement is to capture views of the scene or object from all viewpoints necessary to build a complete 3D model. It should be noted that the efficiency of creating the 3D model and accuracy of 3D model are dependent on the captured images. Less data may result in greater efficiency but less accuracy. More data may be less efficient but provide more accuracy. After a certain amount of data, more data will result in diminishing returns in increased accuracy. Depending on the scene or object to be modeled, different movement paths will result in greater efficiency and accuracy. Generally, a greater number of camera images (video frames) from a wide range of camera poses should be used on areas of the object or scene where accuracy is of the greatest interest.

Once at least the first image is captured, the template pattern recognition engine can begin to recognize template patterns 106. Once the template pattern recognition engine has recognized a first template pattern 106, the pose engine can determine the orientation and position of the camera relative to the recognized template pattern 108. The origin of the world coordinate system is often a specific point on the first reference template or has a known position relative to the first template. When more than one template is used, the position of each template relative to the first template is determined from images containing more than one template in such a way that camera pose is always referenced to the world coordinate origin.

Once the camera pose has been determined for two or more images, the SFM engine can begin to gather data for generating a structural mapping of the scene 110. The SFM Engine automatically detects points of interest in the images of the object or scene and estimates the motion of the points of interest from one image to the next using optical flow or other known SFM techniques thus building a structural mapping of the object or scene. The 3D Modeling Engine then takes the structural model estimates from the SFM engine output and the pose information (camera position and orientation) from the output of the Pose Engine to begin creating a 3D model of the object or scene in world coordinates 112. The 3D Modeling Engine weights the information and makes determinations as to the best fit of the available data. The 3D Modeling Engine also monitors the progression of changes to the model as new information is evaluated. Based on this progression, the 3D modeling engine can estimate that certain accuracy thresholds have been met and that continued processing or gathering of data would have diminishing returns 114. It may then, depending on the application, notify the user that the user selected accuracy threshold has been achieved. The resultant 3D model is saved and the user is provided with a display of the results and provided with a user interface that allows the user to request and receive specific measurement data regarding the modeled object or scene 116 and 118.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

The invention claimed is:

1. An integrated 3D modeling device comprising:
    a camera configured to capture a sequence of images from a sequence of poses relative to a known reference template pattern placed into a scene, or relative to known reference object(s) in the scene to be modeled;
    a template pattern recognition engine configured to recognize the known reference template pattern placed in the scene to be modeled and determine a position of known points of the known reference template pattern or known reference object in an image from the sequences of images captured by the camera;
    a pose engine configured to determine an orientation and a position of the camera (camera pose) relative to the known reference template pattern or known reference object recognized by the template pattern recognition engine;
    a SFM (Structure from Motion) engine configured to determine a relative displacement of each pixel (pixel displacement) from one image to another image from the sequence of images using optical flow, and determine a range to points representing features in the scene from a viewpoint of the camera that captured the images using the pixel displacement produced by the SFM engine and camera pose calculated by the pose engine; and
    a 3D modeling engine configured to combine product from the template pattern recognition and pose engines with product from the SFM engine to provide a dimensionally correct 3D map output of the scene used to generate a 3D model.

2. The 3D modeling device of claim 1, wherein the known reference template pattern has at least four co-planar reference fiducials.

3. The 3D modeling device of claim 1, wherein the known reference template pattern comprises a printed pattern.

4. The 3D modeling device of claim 3, wherein the known reference template pattern comprises a sticker which can be affixed to objects in the scene.

5. The 3D modeling device of claim 3, wherein the known reference template pattern includes color(s) which can more easily be extracted via a digital filter.

6. The 3D modeling device of claim 1, wherein the known reference template pattern includes a pattern of electromagnetic emitting elements.

7. The 3D modeling device of claim 1, wherein the known template pattern recognition engine is further configured to recognize a series of reference template patterns that are placed into the scene or near the object to be modeled, and determine a position of known points of each known reference template pattern in the series.

8. The 3D modeling device of claim 3, wherein the printed pattern comprises at least four co-planar reference fiducials.

9. The 3D modeling device of claim 1, wherein the 3D modeling engine comprises a data processing system configured to create a Quantified Image or Data File which includes the 3D model of the scene and automatically generated measurement data.

10. The 3D modeling device of claim 1, wherein the sequence of poses is fully or partially achieved by moving the object(s) to be modeled.

11. The 3D modeling device of claim 1, wherein the 3D modeling engine is configured to detect and reject outlier data to find a model that best fits a collection of data.

12. The 3D modeling device of claim 11, wherein the 3D modeling engine is further configured to use data filtering to reject the outlier data to find the model that best fits the collection of data.

13. The 3D modeling device of claim 1, wherein the user can query the 3D modeling device to receive specific dimensional measurements from the 3D model.

14. The 3D modeling device of claim 13, wherein the 3D model is stored together with specific measurement data automatically extracted and measurement data of parameters which were manually identified from the 3D model in a Quantified Image or Data File.

15. The 3D modeling device of claim 1, wherein the dimensionally correct 3D model of the scene are in a world coordinate system with an origin that is a specific point relative to the known reference template pattern.

16. The 3D modeling device of claim 15, wherein when more than one known reference template patterns or reference objects is used, the origin of the world coordinate system is a specific point relative to a first known template pattern or reference object detected.

17. The 3D modeling device of claim 1, wherein the 3D modeling engine is further configured to monitor the dimensionally correct 3D model of the scene to estimate an accuracy of the 3D model as more data is captured.

18. The 3D modeling device of claim 17, wherein a user is notified that an estimate accuracy threshold of the 3D model has been reached.

19. The 3D modeling device of claim 1, further comprising a Data Storage Unit configured to store data comprising application specific data, a Quantified Image or Data File, and/or the 3D model.

* * * * *

UNITED STATES PATENT AND TRADEMARK OFFICE
CERTIFICATE OF CORRECTION

Page 1 of 1

PATENT NO. : 10,068,344 B2
APPLICATION NO. : 15/123662
DATED : September 4, 2018
INVENTOR(S) : Dejan Jovanovic et al.

It is certified that error appears in the above-identified patent and that said Letters Patent is hereby corrected as shown below:

On the Title Page

Item (72) inventors should read:
--Dejan Jovanovic, Austin, TX (US)--

Signed and Sealed this
Twenty-third Day of October, 2018

Andrei Iancu
*Director of the United States Patent and Trademark Office*